US009937920B2

(12) United States Patent
Lindström et al.

(10) Patent No.: US 9,937,920 B2
(45) Date of Patent: Apr. 10, 2018

(54) PROPULSION SYSTEM FOR A VEHICLE

(71) Applicant: Scania CV AB, Södertälje (SE)

(72) Inventors: Johan Lindström, Nyköping (SE);
Mathias Björkman, Tullinge (SE);
Mikael Bergquist, Huddinge (SE);
Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 73 days.

(21) Appl. No.: 15/106,975

(22) PCT Filed: Dec. 22, 2014

(86) PCT No.: PCT/SE2014/051559
§ 371 (c)(1),
(2) Date: Jun. 21, 2016

(87) PCT Pub. No.: WO2015/099593
PCT Pub. Date: Jul. 2, 2015

(65) Prior Publication Data
US 2017/0001634 A1 Jan. 5, 2017

(30) Foreign Application Priority Data
Dec. 23, 2013 (SE) ...................... 1351575

(51) Int. Cl.
B60W 20/00 (2016.01)
B60W 10/02 (2006.01)
(Continued)

(52) U.S. Cl.
CPC ............. *B60W 20/40* (2013.01); *B60K 1/02* (2013.01); *B60K 6/365* (2013.01); *B60K 6/387* (2013.01);
(Continued)

(58) Field of Classification Search
None
See application file for complete search history.

(56) References Cited

U.S. PATENT DOCUMENTS 5,433,282 A 7/1995 Moroto et al.
5,492,189 A 2/1996 Kriegler et al.
(Continued)

FOREIGN PATENT DOCUMENTS

DE 19628000 A1 1/1997
DE 19838853 A1 3/1999
(Continued)

OTHER PUBLICATIONS

International Search Report for PCT/SE2014/051559 dated Apr. 22, 2015.
(Continued)

Primary Examiner — Jacob S. Scott
(74) Attorney, Agent, or Firm — Moore & Van Allen PLLC; W. Kevin Ransom

(57) ABSTRACT

A drive system for a vehicle comprises two electrical machines arranged between a combustion engine and an input shaft to a gearbox. The first machine rotor is connected with a planetary gear component, and the input shaft of the gearbox with another planetary gear component. The second machine rotor is connected with the output shaft of the combustion engine, which is also connected with another planetary gear component. A first locking means movable between a locked position, wherein the planetary gear's three components rotate at the same rotational speed, and a release position, wherein the components rotate at different rotational speeds. A second locking means movable between a locked position, and a release position wherein the combustion engine's output shaft is locked to a stationary element in the locked position and disconnected in the (Continued)

release position to rotate with the second machine rotor and a planetary gear component.

10 Claims, 2 Drawing Sheets

(51) Int. Cl.
| | |
|---|---|
| *B60W 10/06* | (2006.01) |
| *B60W 10/08* | (2006.01) |
| *B60W 30/18* | (2012.01) |
| *B60K 1/02* | (2006.01) |
| *B60K 6/365* | (2007.10) |
| *B60K 6/387* | (2007.10) |
| *B60K 6/40* | (2007.10) |
| *B60K 6/42* | (2007.10) |
| *B60K 6/44* | (2007.10) |
| *B60K 6/445* | (2007.10) |
| *B60K 6/547* | (2007.10) |
| *B60K 6/50* | (2007.10) |
| *F16H 3/72* | (2006.01) |
| *F16H 3/76* | (2006.01) |
| *B60W 20/40* | (2016.01) |

(52) U.S. Cl.
CPC ............. *B60K 6/44* (2013.01); *B60W 10/02* (2013.01); *B60W 10/06* (2013.01); *B60W 10/08* (2013.01); *B60W 20/00* (2013.01); *F16H 3/727* (2013.01); *B60K 6/40* (2013.01); *B60K 6/547* (2013.01); *B60W 30/18* (2013.01); *B60W 2710/125* (2013.01); *B60Y 2300/84* (2013.01); *Y10S 903/945* (2013.01)

(56) References Cited

U.S. PATENT DOCUMENTS

| | | | |
|---|---|---|---|
| 5,508,574 | A | 4/1996 | Vlock |
| 6,018,198 | A | 1/2000 | Tsuzuki et al. |
| 6,354,974 | B1 | 3/2002 | Kozarekar |
| 6,579,201 | B2 | 6/2003 | Bowen |
| 7,237,634 | B2 | 7/2007 | Severinsky et al. |
| 7,282,008 | B2 | 10/2007 | Oshidari |
| 8,182,391 | B2 | 5/2012 | Klemen et al. |
| 8,403,807 | B2 | 3/2013 | Tabata et al. |
| 8,500,589 | B2 | 8/2013 | Ortmann et al. |
| 8,840,502 | B2 | 9/2014 | Bergquist |
| 8,905,892 | B1 | 12/2014 | Lee et al. |
| 9,139,076 | B2 | 9/2015 | Lee et al. |
| 9,266,418 | B2 | 2/2016 | Lee et al. |
| 9,441,708 | B2 | 9/2016 | Kimes et al. |
| 9,643,481 | B2 | 5/2017 | Goleski et al. |
| 2005/0049100 | A1 | 3/2005 | Ai et al. |
| 2007/0102209 | A1 | 5/2007 | Doebereiner |
| 2008/0009380 | A1 | 1/2008 | Iwanaka et al. |
| 2008/0081734 | A1 | 4/2008 | Duffy et al. |
| 2008/0318728 | A1 | 12/2008 | Soliman et al. |
| 2009/0145673 | A1 | 6/2009 | Soliman et al. |
| 2010/0099532 | A1 | 4/2010 | Cashen |
| 2012/0197475 | A1 | 8/2012 | Akutsu et al. |
| 2013/0102429 | A1 | 4/2013 | Kaltenbach et al. |
| 2013/0316865 | A1 | 11/2013 | Engström et al. |
| 2014/0024490 | A1 | 1/2014 | Bangura et al. |
| 2014/0051537 | A1* | 2/2014 | Liu ..................... F16H 3/72 475/5 |
| 2014/0243149 | A1 | 8/2014 | Holmes et al. |
| 2015/0239459 | A1 | 8/2015 | Pettersson et al. |
| 2015/0375734 | A1 | 12/2015 | Pettersson et al. |
| 2016/0159344 | A1 | 6/2016 | Hata et al. |
| 2016/0176396 | A1 | 6/2016 | Hata et al. |
| 2016/0288784 | A1 | 10/2016 | Teraya et al. |
| 2017/0001634 | A1 | 1/2017 | Lindstrom et al. |
| 2017/0043763 | A1 | 2/2017 | Ketfi-Cherif et al. |
| 2017/0144649 | A1 | 5/2017 | Bangura et al. |
| 2017/0282702 | A1 | 10/2017 | Kim |

FOREIGN PATENT DOCUMENTS

| | | |
|---|---|---|
| DE | 19841829 A1 | 3/2000 |
| DE | 102006054405 A1 | 6/2008 |
| DE | 102007004458 A1 | 7/2008 |
| DE | 102007004464 A1 | 7/2008 |
| DE | 19628000 B4 | 1/2010 |
| DE | 19838853 B4 | 11/2013 |
| EP | 552140 A1 | 10/1995 |
| EP | 552140 B1 | 10/1995 |
| EP | 1145896 A1 | 10/2001 |
| EP | 769404 A1 | 12/2001 |
| EP | 1304249 A2 | 4/2003 |
| EP | 1319546 A1 | 9/2004 |
| EP | 1319546 B1 | 9/2004 |
| EP | 2436546 A1 | 4/2012 |
| FR | 2832356 A1 | 5/2003 |
| JP | 07135701 A | 5/1995 |
| JP | 11332018 A | 11/1999 |
| JP | 3291871 B2 | 6/2002 |
| SE | 1051384 A1 | 6/2012 |
| SE | 536329 C2 | 8/2013 |
| SE | 1200390 A1 | 12/2013 |
| SE | 1200394 A1 | 12/2013 |
| SE | 1250696 A1 | 12/2013 |
| SE | 1250698 A1 | 12/2013 |
| SE | 1250699 A1 | 12/2013 |
| SE | 1250700 A1 | 12/2013 |
| SE | 1250702 A1 | 12/2013 |
| SE | 1250706 A1 | 12/2013 |
| SE | 1250708 A1 | 12/2013 |
| SE | 1250711 A1 | 12/2013 |
| SE | 1250716 A1 | 12/2013 |
| SE | 1250717 A1 | 12/2013 |
| SE | 1250718 A1 | 12/2013 |
| SE | 1250720 A1 | 12/2013 |
| SE | 536559 C2 | 2/2014 |
| WO | 0006407 A1 | 2/2000 |
| WO | 2007113438 A1 | 10/2007 |
| WO | 2008016357 A2 | 2/2008 |
| WO | 2012091659 A1 | 7/2012 |
| WO | 2013002707 A1 | 1/2013 |

OTHER PUBLICATIONS

Written Opinion of the International Search Authority for PCT/SE2014/051559 dated Apr. 22, 2015.
European Search Report from the European Patent Office for PCT/SE2014/051559 dated Jul. 25, 2017.

\* cited by examiner

PROPULSION SYSTEM FOR A VEHICLE

CROSS REFERENCE TO THE APPLICATION

This application is a national stage application (filed under 35 § U.S.C. 371) of PCT/SE2014/051559, filed Dec. 22, 2014 of the same title, which, in turn claims priority to Swedish Application No. 1351575-4, filed Dec. 23, 2013 of the same title; the contents of each of which are hereby incorporated by reference.

FIELD OF THE INVENTION

The present invention relates to a drive system for a vehicle, and is particularly, but not exclusively, focused on such a drive system in motor vehicles in the form of wheeled commercial vehicles, especially heavy goods vehicles such as trucks and buses. The invention thus relates to a drive system for driving a hybrid vehicle which, generally, is a vehicle that may be powered by a primary engine, in this case a combustion engine, and a secondary engine, in this case an electrical machine. The vehicle is suitably equipped with means for storage of energy, such as a battery or a capacitor for storage of electric energy, and control equipment to control the flow of electric energy between the means and the electrical machine. The electrical machine may thus alternately operate as an engine or as a generator, depending on the vehicle's operating mode. When the vehicle decelerates, the electrical machine generates energy that may be stored, and the stored electric energy is used later for e.g. operation of the vehicle.

BACKGROUND OF THE INVENTION

Using a conventional clutch mechanism, which disconnects the input shaft of the gearbox from the combustion engine during a shifting process in the gearbox, entails disadvantages, such as heating of the clutch mechanism's discs, which results in an increased fuel consumption and wear of the clutch discs. There are also large losses as a result, in particular when the vehicle is started. A conventional clutch mechanism is also relatively heavy and costly. It also occupies a relatively large space in the vehicle. Friction losses also arise at the use of a hydraulic converter/torque converter commonly used in automatic transmission. By ensuring that the vehicle has a drive system in which the output shaft of the combustion engine, the rotor of the electrical machine and the input shaft of the gearbox are connected with a planetary gear, the conventional clutch mechanism and disadvantages associated therewith may be avoided. A vehicle with a drive system of this type constitutes prior art, as set out in EP 1 319 546 and SE 1051384-4.

Although this drive system, especially the one described in SE 1051384-4, functions well and has a range of advantageous features, efforts are constantly made to improve such a drive system with respect to its behavior and function in certain operating situations.

SUMMARY OF THE INVENTION

The objective of the present invention is to show a drive system of the type defined above, which is in line with the above-mentioned efforts. This objective is achieved according to the invention by providing a drive system.

By equipping the drive system with a second electrical machine and said second locking means, an improved behavior is obtained in a range of operational situations compared to such prior art drive systems. Specifically, when braking the vehicle it becomes possible to have the first locking means in a release position, without being limited by the reaction torque with which the combustion engine may resist. It also becomes possible to start the combustion engine when the torque is transmitted through the powertrain, i.e. out of the gearbox. When the vehicle is at a standstill it also becomes possible to drive while maintaining a power balance, i.e. while supplying an energy storage means, such as a battery, and other electrical loads of the vehicle with a controlled current/power while a desired torque is maintained in the powertrain. Under most circumstances this is not achievable in prior art drive systems of this type.

"Electric energy storage"/"storage of electric energy"/"energy storage", as used in this document, means an energy storage means with an electrical interface in relation to the first and second electrical machine of the drive system, but storage of energy does not have to be electrical. This entails that in addition to an electrical battery and capacitor, e.g. flywheels, other mechanical means and means for building up pressure, e.g. pneumatic or hydraulic, may be possible.

According to one embodiment of the invention, the output shaft of the combustion engine, the first electrical machine's rotor, the second electrical machine's rotor and the input shaft of the gearbox are rotatably arranged around a common rotation axis.

According to another embodiment of the invention, the planetary gear's sun wheel constitutes said first component and the ring gear constitutes said third component. By connecting the first electrical machine's rotor with the ring gear and the combustion engine's output shaft with the sun wheel, a compact construction is achieved, which is easy to fit into already existing spaces for powertrains (drive systems) with clutch mechanisms instead of planetary gears. A hybrid gearbox may thus be made compact and substantially no bulkier than a standard gearbox. This entails that the weight increase, which a hybridization normally involves, may be reduced considerably. Another advantage is that a connection of the first electrical machine's rotor with the ring gear provides a higher potential braking torque via the rotor, than if this were connected with the sun wheel instead.

According to another embodiment of the invention, the drive system comprises at least one control device adapted to control the fuel supply to the combustion engine, and to control exchange of electric energy between the first and second electrical machine, on the one hand, and electric energy storage means on the other hand. The control device is advantageously also adapted to control said locking means to be moved between said locked position and release position, and, in order to lock them together, to control the combustion engine and/or the first electrical machine and/or the second electrical machine to achieve the same rotational speed in the parts to be locked together by the respective locking means and, subsequently, to move the locking means to a locked position, and, in order to release them, to control the combustion engine and/or the first electrical machine and/or the second electrical machine to achieve a torque balance between the parts to be released from each other and, subsequently, for the locking means to be moved to a release position. For the second locking means, zero rotational speed is required to lock said parts together, and substantially zero torque is required to move to a release position.

Here, torque balance is achieved when the following relation between the torques applied is met for the example configuration displayed in FIG. 3:

$$T_{sun\ wheel} = \frac{Z_s}{Z_r} T_{ring\ gear}$$

where $T_{sun\ wheel}$ and $T_{ring\ gear}$ is torque applied to the sun wheel and the ring gear, and here $T_{sun\ wheel} = T_{ice} + T_{em2}$ and $T_{ring\ gear} = T_{em1}$ with $T_{ice}$ being torque applied on the combustion engine's output shaft $T_{em2}$ is torque applied via the second electrical machine's stator to its rotor $T_{em1}$ is torque applied via the first electrical machine's stator to its rotor, $Z_s$ is the number of teeth of the sun wheel, $Z_r$ is the number of teeth of the ring gear.

Accordingly, torque balance means the state where a torque acts on a ring gear arranged in the planetary gear, corresponding to the product of the torque acting on the planetary gear's planetary wheel carrier and the planetary gear's gear ratio, while simultaneously a torque acts on the planetary gear's sun wheel, corresponding to the product of the torque acting on the planetary wheel carrier and (1 minus the planetary gear's gear ratio). At such torque balance, said first locking means 34 does not transfer any torque between the components of the planetary gear.

According to another embodiment of the invention, the control device is adapted to control, when the vehicle is driven with the combustion engine shut off, the second locking means in a locked position, and the first locking means in a release position for start of the combustion engine, the first electrical machine to transfer the requested torque to the input shaft of the gearbox, the second electrical machine towards and to the reaction torque of said first component in the planetary gear, in order to create a substantially zero torque over the second locking means, the second locking means to be moved to the release position, and the second electrical machine towards and to the combustion engine's idling engine speed, and injection of fuel into the combustion engine.

Since the combustion engine may be started in this way without the gear being disengaged from the gearbox, such a start may take place while maintaining forward momentum. The second locking means may be moved to the release position with a full powertrain torque from the first electrical machine.

According to another embodiment of the invention, the control device is adapted to control, when the vehicle is driven with the combustion engine on, the first locking means in a locked position, and the second locking means in a release position for turning off the combustion engine, and transition to powering the vehicle with the electrical machines, the combustion engine and/or the first electrical machine and/or the second electrical machine to achieve a torque balance in the planetary gear, the first locking means to be moved to the release position, cessation of injection of fuel into the combustion engine, the second electrical machine towards and to a standstill, and the second locking means to be moved to a locked position.

Accordingly, controlled stopping of the combustion engine is achieved, at which its engine speed may be controlled in such a manner that vibrations are avoided. Such a stop may be carried out without the torque in the powertrain, i.e. the torque transmitted to the input shaft of the gearbox and further downstream of the gearbox, disappearing. After the combustion engine has stopped and the second locking means has moved to a locked position, the second electrical machine may not, however, be used.

According to another embodiment of the invention, the control device is adapted to control, when the vehicle is at a standstill with the combustion engine running at idling speed, the first locking means in a release position, and the second locking means in a release position for driving of the vehicle with power balance, the first electrical machine for delivery of a torque thereof, so that the requested torque is transmitted to the input shaft of the gearbox, the combustion engine towards and to its idling speed, the second electrical machine to deliver a torque so that the desired power to the energy storage means comprised in the vehicle and the electrical load is achieved, in case the torque available in the combustion engine at idling speed is insufficient to counteract both the reaction torque from the first electrical machine and the torque applied from the second electrical machine, to increase the engine speed of the combustion engine in order to increase the torque available from the combustion engine, and the first locking means to be moved to a locked position when the input shaft of the gearbox, the first electrical machine and the combustion engine's output shaft rotate with the same rotational speed.

As long as none of the combustion engine, the first electrical machine and the second electrical machine achieve their performance limits, both the desired torque and the desired electrical power may be achieved at such start of driving. If the torque available in the combustion engine is insufficient, the engine speed may be increased or the output target may be abandoned. If the second electrical machine reaches its limit, the output target must be abandoned. Abandoning the output target entails that the electrical energy storage means must deliver a current to the first electrical machine and to electrical loads. This is usually possible, although not desirable. Initially, the rotor rotates backwards in the first electrical machine during the start, and generates output when a positive torque must be achieved. In some cases it may be difficult for a battery to receive the output generated, e.g. at low temperatures of the battery, but in such case this output may be consumed by the second electrical machine, by way of it delivering a torque that helps the combustion engine's output shaft to rotate.

According to another embodiment of the invention, the control device is adapted to control, when the vehicle is driven with the combustion engine running, and the first and second locking means in a release position when braking the vehicle towards stop, the desired braking torque to be distributed between the first and second electrical machines, when a certain value of the vehicle's speed is not met, the first and second electrical machine so that torque balance is achieved in the planetary gear, at the same time as the total torque transmitted to the input shaft of the gearbox corresponds to the desired braking torque, the first locking means to be moved to the release position, the combustion engine towards and to idling speed, and ramping down of the total braking torque from the first and second electrical machine towards zero in connection with the vehicle stopping.

With two electrical machines, the desired braking torque may usually be achieved without any requirement to shift gears while braking. Since gear shifting is avoided, no braking energy is lost due to torque from an electrical machine being ramped down to prepare for a gear shift. The first locking means may be moved to the release position and kept in this position while simultaneously the desired braking torque may be maintained. Accordingly, the fraction of braking energy that may be regenerated with a hybrid system is greatly increased.

The invention also relates to a vehicle and methods with the method steps that the control device is adapted to carry out in the above-mentioned embodiments of the drive system according to the invention.

Other advantageous features and advantages of the invention are set out in the description below.

BRIEF DESCRIPTION OF THE DRAWINGS

Below are descriptions of an example embodiment of the invention with reference to the enclosed drawings, in which.

DETAILED DESCRIPTION OF THE INVENTION

Figure 1:
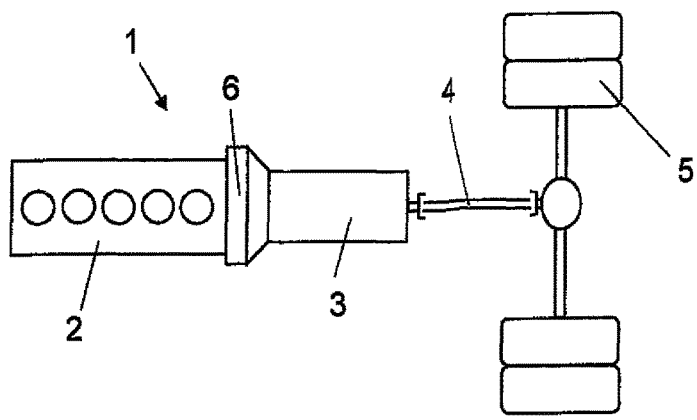
FIG. 1 is a very simplified view of a powertrain in a vehicle, which may be equipped with a drive system according to the invention.
Figure 2:
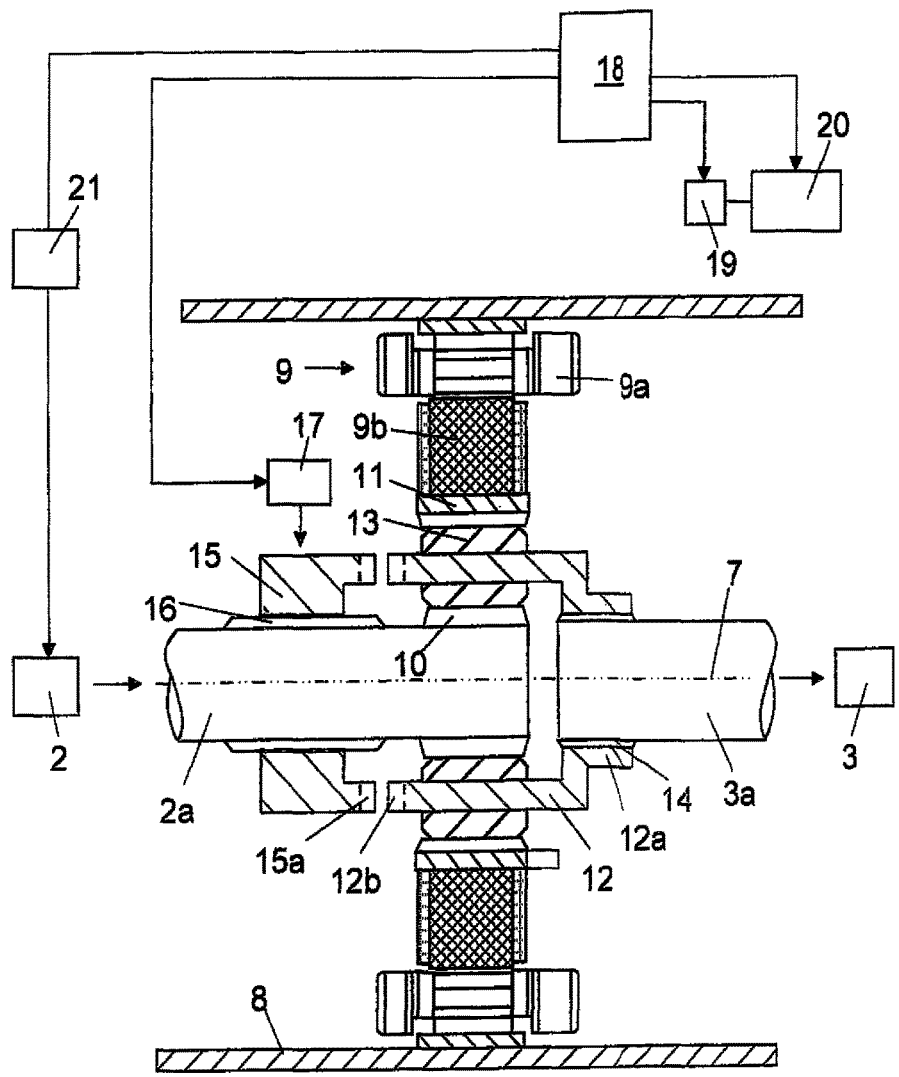
FIG. 2 is a more detailed, but still simplified view of a part of said drive system.

FIG. 1 shows a powertrain for a heavy goods vehicle 1. The powertrain comprises a combustion engine 2, a gearbox 3, a number of driving shafts 4 and driving wheels 5. Between the combustion engine 2 and the gearbox 3, the powertrain comprises an intermediate section 6. FIG. 2 shows a part of the components in the intermediate section 6 in more detail, more specifically those that also occur in prior art drive systems, such as the one according to SE 1051384-4. The combustion engine 2 is equipped with an output shaft 2a, and the gearbox 3 with an input shaft 3a in the intermediate section 6. The output shaft 2a of the combustion engine is coaxially arranged in relation to the input shaft 3a of the gearbox. The combustion engine's output shaft 2a and the input shaft 3a of the gearbox are rotatably arranged around a common rotation axis 7. The intermediate section 6 comprises a house 8, enclosing a first electrical machine 9 and a planetary gear. The electrical machine 9 comprises, in a customary manner, a stator 9a and a rotor 9b. The stator 9a comprises a stator core which is mounted in a suitable manner on the inside of the house 8. The stator core comprises the stator's windings. The first electrical machine 9 is adapted, under certain operating circumstances, to use stored electrical energy to supply driving force to the input shaft 3a of the gearbox, and, under other operating conditions, to use the kinetic energy of the input shaft 3 of the gearbox to extract and store electric energy.

The planetary gear is arranged substantially radially on the inside in relation to the electrical machine's stator 9a and rotor 9b. The planetary gear comprises, in a customary manner, a sun wheel 10, a ring gear 11 and a planetary wheel carrier 12. The planetary wheel carrier 12 supports a number of cogwheels 13, which are rotatably arranged in a radial space between the teeth of the sun wheel 10 and the ring gear 11. The sun wheel 10 is fixed on a peripheral surface of the combustion engine's output shaft 2a. The sun wheel 10 and the combustion engine's output shaft 2a rotate as one unit with a first rotational speed $n_1$. The planetary wheel carrier 12 comprises an attachment section 12a, which is attached on a peripheral surface of the input shaft 3a of the gearbox with the help of a splines joint 14. With the help of this joint, the planetary wheel carrier 12 and the input shaft 3a of the gearbox may rotate as one unit with a second rotational speed $n_2$. The ring gear 11 comprises an external peripheral surface on which the rotor 9b is fixedly mounted. The rotor 9b and the ring gear 11 constitute a rotatable unit that rotates with a third rotational speed $n_3$.

The drive system comprises a first locking means, since the combustion engine's output shaft 2a is equipped with a shiftable clutch element 15. The clutch element 15 is mounted on the combustion engine's output shaft 2a with the help of a splines joint 16. The clutch element 15 is in this case arranged in a twist-fast manner on the combustion engine's output shaft 2a, and is shiftably arranged in an axial direction on the combustion engine's output shaft 2a. The clutch element 15 comprises a clutch section 15a, which is connectable with a clutch section 12b in the planetary wheel carrier 12. A schematically displayed shifting element 17 is adapted to shift the clutch element 15 between a first position where the clutch sections 15a, 12b are not in engagement with each other, corresponding to a release position in the first locking means, and a second position where the clutch sections 15a, 12b are in engagement with each other, corresponding to a locked position of the first locking means. In this locked position the combustion engine's output shaft 2a and the input shaft 3a of the gearbox will be locked together, and these, as well as the electrical machine's rotor, will thus rotate at the same rotational speed. This state may be referred to as a locked planet. The locking mechanism may, advantageously, also have the design which is described in the not yet public Swedish patent application 1250696-0, and comprise a sleeve equipped with first splines, which splines, in the release position, engage with second splines on a first component of the planetary gear and, in the locked position, engage with third splines on a second component of the planetary gear. In this case, the first component is preferably the planetary wheel carrier, and the second component is the sun wheel. The locking mechanism may then be adapted like an annular sleeve, enclosing the planetary wheel carrier substantially concentrically. The locking means may also consist of a suitable type of friction clutch.

An electric control device 18 is adapted to control the shifting element 17. The control device 18 is also adapted to determine the occasions on which the electrical machine should operate as an engine, and on which occasions it should operate as a generator. To determine this, the control device 18 may receive up-to-date information relating to suitable operating parameters. The control device 18 may be a computer with software for this purpose. The control device 18 controls a schematically displayed control equipment 19, which controls the flow of electric energy between a hybrid battery 20 and the stator windings 9a of the electrical machine. On occasions where the electrical machine 9 operates as an engine, stored electric energy is supplied from the hybrid battery 20 to the stator 9a. On occasions where the electrical machine operates as a generator, electric energy is supplied from the stator 9a to the hybrid battery 20. The hybrid battery 20 delivers and stores electric energy with a voltage in the range of 300-900 volts. Since the intermediate section 6 between the combustion engine 2 and the gearbox 3 in the vehicle is limited, the electrical machine 9 and the planetary gear must constitute a compact unit. The planetary gear's components 10, 11, 12 are arranged substantially radially inside the electrical machine's stator 9a. The rotor 9b of the electrical machine, the ring gear 11 of the planetary gear, the combustion engine's output shaft 2a, and the input shaft 3a of the gearbox, are here rotatably arranged around a common rotation axis 5. With such an embodiment, the electrical machine 9 and the planetary gear occupy a relatively small area. The vehicle 1 is equipped with an engine control function 21 with which the engine speed $n_1$ of the combustion engine 2 may be controlled. The control device 18 thus has the possibility of activating the engine control function 21 and of creating a substantially zero torque state in the gearbox 3 at engagement and disengagement of gears in the gearbox 3. The drive system may also, instead of being controlled by one single control device 18, be controlled by several different control devices.

Figure 3:
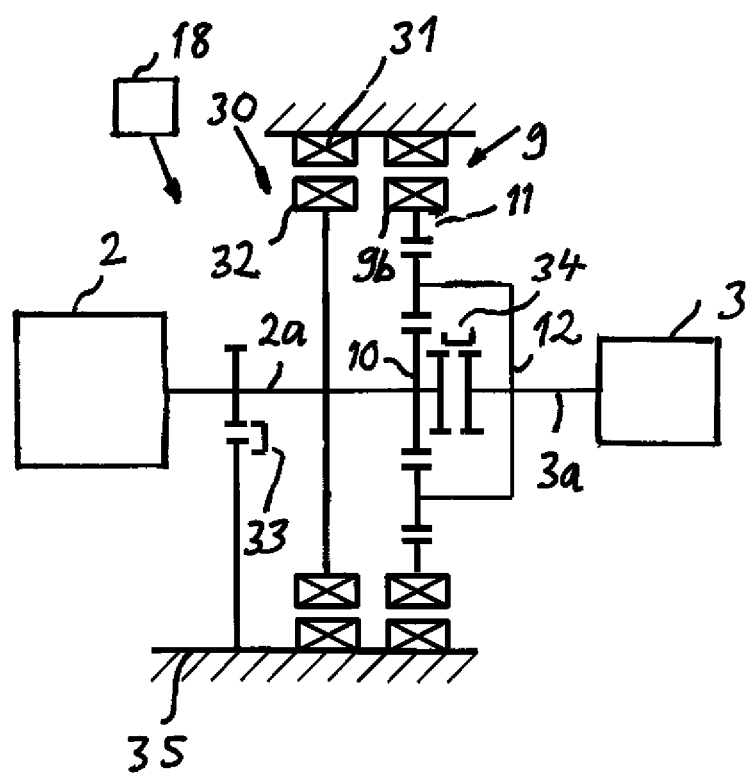
FIG. 3 is a simplified view illustrating the general structure of a drive system according to one embodiment of the invention.

The part of the drive system according to the invention described thus far and displayed in FIG. 2 is present in the drive system according to SE 1051384-4. Below, the part of the drive system according to the invention, which has been added to this part, will be described with reference to FIG. 3.

The drive system, specifically the intermediate section 6, according to the present invention also has a second electrical machine 30 with a stator 31, with stator windings and a rotor 32 connected with the output shaft 2a of the combustion engine. A second locking means 33, which may have a similar design as the first locking means 34, which is illustrated in further detail in FIG. 2, is adapted to, in a locking position, lock the output shaft 2a of the combustion engine with a stationary element 35 in the vehicle, and in a release position, to disconnect the output shaft 2a of the combustion engine from the stationary element, so that this shaft is free to rotate with the rotor 32 of the second electrical machine and the planetary gear's sun wheel. The control device 18 is adapted to control fuel supply to the combustion engine 2, and to control exchange of electric energy between the first electrical machine 9 and the second electrical machine 30 on the one hand, and electric energy storage means such as batteries, on the other hand.

A range of positive features of the drive system are achieved by way of the added arrangement of the second electrical machine 30 and the second locking means 33, some of the most important of which have been described in the introduction of this document. For example, the combustion engine 2 may be started when the vehicle is operated via electric driving, without any torque in the powertrain disappearing, i.e. without any torque interruption, since this torque is achieved with the first electrical machine 9, while simultaneously zero torque is created between the parts locked together by the second locking means 33, since the second electrical machine 30 is controlled towards and to the reaction torque of the sun wheel. Likewise, at the operation of the vehicle with the combustion engine running, this may be shut off and stopped without any torque in the powertrain disappearing. The possibilities of achieving power balance are also improved considerably, thanks to the addition of the second electrical machine and the second locking means, wherein at such power balance the sum of the desired current to/from the electrical storage means and electrical loads may be both negative and positive. The term power balance relates to the fact that it is possible, within the general limitations specified for the drive system, to freely choose the charge current or discharge power from the energy storage means/hybrid battery in all operating modes.

It is especially advantageous that it is possible to start driving the vehicle equipped with the drive system, even though the batteries of the vehicle, which constitute its electrical energy storage means, are very cold and may not receive any current. At the start of the vehicle, the first electrical machine 9 rotates backwards and thus generates output when a positive torque must be achieved. The output generated may in such case not be received by the battery, but it may be consumed by the second electrical machine 30, since the latter applies a torque on the output shaft of the combustion engine and helps to rotate such output shaft.

The advantages described above are achieved also at braking of a vehicle, which initially drives at e.g. a speed of approximately 50 km/h with the combustion engine running, since the drive system according to the invention has two electrical machines. Accordingly, usually torque balance may be reached in the planetary gear, without any reduction of the total braking torque being required. The same total braking torque may then be maintained when the first locking means is moved to the release position, i.e. the planetary gear is unlocked, and the combustion engine is controlled to its idling engine speed.

Therefore, it is often advantageous to brake in one and the same gear all the way until the vehicle stops, which is facilitated in the drive system according to the invention.

The invention is obviously not limited in any way to the embodiments described above, but numerous possible modifications thereof should be obvious to a person skilled in the area, without such person departing from the spirit of the invention as defined by the appended claims.

The first locking means may be adapted to lock together any two of said three components.

A transmission could be arranged between the rotor and the ring gear, and also between the combustion engine's output shaft and the sun wheel, such as upstream of the shaft which is displayed in FIG. 2 to be connected with the sun wheel. The latter transmission could also consist of a variable gear.

It is also conceivable that the drive system has the ring gear as the first component and the sun wheel as the third component, even if the reverse would be preferable because of the advantages mentioned above.

The drive system according to the present application may at least in some situations also be advantageously used without any energy storage means/hybrid battery comprised. In applicable situations, energy is then instead exchanged, only between the first electrical machine and the second electrical machine. One example of an application of this method is the replacement of the function of a traditional coupling device (typically, a friction coupling) or a hydraulic torque converter where such is normally exposed to high heat development and/or wear. Advantageously, a traditional friction coupling in a heavy tractor may, according to the present application, e.g. be replaced with a drive system that does not comprise any energy storage means/hybrid battery. Another example of an application where the drive system according to the present application may be used without comprising any energy storage means/hybrid battery is at the implementation of shifting, when the drive system may be used to control/adjust/regulate the torque and/or engine speed of the input shaft of the gearbox and/or of the output shaft/flywheel of the combustion engine to carry out shifting in an advantageous manner. Energy is therefore exchanged only between the first electrical machine and the second electrical machine.

The invention claimed is:

1. A drive system for a vehicle, wherein the drive system comprises an output shaft in a combustion engine, an input shaft of a gearbox, a first electrical machine comprising a stator and a rotor, a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of the third of said components, wherein the drive system also comprises a first locking means, which may be moved between a locked position in which two of said components are locked together, so that the three components rotate with the same rotational speed, and a release position in which the components are allowed to rotate at different rotational speeds, wherein the drive system comprises a second electrical machine with a stator and a rotor, connected with the output shaft of the combustion engine between the combustion engine and said first of said components, and a second locking means which may be moved between a locked position in which the output shaft of the combustion engine is locked to a stationary element in the vehicle, and a release position in which the combustion output shaft of the engine is disconnected from the stationary element, and free to rotate with the rotor of the second electrical machine and said first of said components.

2. The drive system according to claim 1, wherein the output shaft of the combustion engine, the rotor of the first electrical machine, the rotor of the second electrical machine, and the input shaft of the gearbox are rotatably arranged around a common rotation axis.

3. The drive system according to claim 1, wherein the planetary gear's sun wheel is said first of said components and the ring gear is said third of said components.

4. The drive system according to claim 1, further comprising at least one control device, adapted to control fuel supply to the combustion engine and to control exchange of electrical energy between the first and second electrical machine on the one hand, and, storage means of electric energy on the other hand.

5. The drive system according to claim 4, wherein the control device is adapted to control said locking means to be moved between said locked position and release position and, in order to lock, to control the combustion engine and/or the first electrical machine and/or the second electrical machine to achieve the same rotational speed in the parts to be locked together by the respective locking means, and, subsequently, to move the locking means to a locked position and, in order to release, to control the combustion engine and/or the first electrical machine and/or the second electrical machine to achieve a torque balance between the parts to be released from each other, and, subsequently, for the locking means to be moved to a release position.

6. The drive system according to claim 5, wherein the control device is adapted to control, when the vehicle is driven with the combustion engine turned off, the second locking means in a locked position, and the first locking means in a release position for start of the combustion engine,
the first electrical machine to transfer the requested torque to the input shaft of the gearbox;
the second electrical machine towards and to the reaction torque of said first of said components in the planetary gear, in order to create a zero torque over the second locking means;
the second locking means to be moved to the release position;
the second electrical machine towards and to the combustion engine's idling engine speed; and
injection of fuel into the combustion engine.

7. The drive system according to claim 5, wherein the control device is adapted to control, when the vehicle is driven with the combustion engine running, the first locking means in a locked position, and the second locking means in a release position for turning off the combustion engine, and a transition to powering the vehicle by way of the electrical machines
the combustion engine and/or the first electrical machine and/or the second electrical machine to achieve a torque balance in the planetary gear;
the first locking means to be moved to the release position;
cessation of injection of fuel into the combustion engine;
the second electrical machine towards and to a standstill; and
the second locking means to be moved to a locked position.

8. The drive system according to claim 5, wherein the control device is adapted to control, when the vehicle is at a standstill with the combustion engine running at idling engine speed, the first locking means is in a release position, and the second locking means is in a release position to start driving the vehicle with power balance,
the first electrical machine for delivery of a torque thereof, so that the requested torque is transmitted to the input shaft of the gearbox;
the combustion engine towards and to its idling speed;
the second electrical machine to deliver a torque, so that the desired power to the energy storage means and electrical loads comprised in the vehicle are achieved;
in case the torque available in the combustion engine at idling speed is insufficient to both counteract the reaction torque from the first electrical machine, and the torque applied from the second electrical machine, to increase the engine speed of the combustion engine in order to increase the torque available from the combustion engine; and
the first locking means to be moved to a locked position when the input shaft ($3a$) of the gearbox, the rotor of the first electrical machine, and the output shaft of the combustion engine rotate with the same rotational speed.

9. The drive system according to claim 5, wherein the control device is adapted to control, when the vehicle is driven with the combustion engine running, and the first locking means and the second locking means in a release position when braking the vehicle towards stop,
the desired braking torque to be distributed between the first and second electrical machines;

when a certain value of the vehicle's speed is not met, the first and second electrical machine, so that torque balance is achieved in the planetary gear at the same time as the total torque transmitted to the input shaft of the gearbox corresponds to the desired braking torque;

the first locking means to be moved to the release position;

the combustion engine towards and to its idling speed; and ramping down of the total braking torque from the first and second electrical machine towards zero in connection with the vehicle stopping.

10. A vehicle comprising a drive system wherein the drive system comprises an output shaft in a combustion engine, an input shaft of a gearbox, a first electrical machine comprising a stator and a rotor, a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of the third of said components, wherein the drive system also comprises a first locking means, which may be moved between a locked position in which two of said components are locked together, so that the three components rotate with the same rotational speed, and a release position in which the components are allowed to rotate at different rotational speeds, wherein the drive system comprises a second electrical machine with a stator and a rotor, connected with the output shaft of the combustion engine between the combustion engine and said first of said components, and a second locking means which may be moved between a locked position in which the output shaft of the combustion engine is locked to a stationary element in the vehicle, and a release position in which the combustion output shaft of the engine is disconnected from the stationary element, and free to rotate with the rotor of the second electrical machine and said first of said components.

* * * * *